United States Patent [19]

Hutchins

[11] 4,040,528

[45] Aug. 9, 1977

[54] WAREHOUSING SYSTEM WITH TURNTABLE HAVING OPPOSED ARTICLE RECEIVING STATIONS THEREON

[75] Inventor: Kenneth A. Hutchins, Fort Wayne, Ind.

[73] Assignee: Peter Eckrich and Sons, Inc., Fort Wayne, Ind.

[21] Appl. No.: 591,457

[22] Filed: June 30, 1975

[51] Int. Cl.² .............................................. B65G 1/06
[52] U.S. Cl. ............................ 214/16.4 A; 214/16.4 R
[58] Field of Search ........... 214/16.1 A, 16 B, 16.4 A, 214/16.4 R; 186/1 R, 1 A

[56] References Cited

U.S. PATENT DOCUMENTS

| 2,391,287 | 12/1945 | Anchor | 186/1 R |
|---|---|---|---|
| 2,771,200 | 11/1956 | Gilliard | 214/16.1 A |
| 2,779,484 | 1/1957 | Schromm et al. | 214/16.1 A |
| 3,246,722 | 4/1966 | Morrice | 186/1 R |
| 3,554,391 | 1/1971 | Goodell | 214/16.4 R |
| 3,737,057 | 6/1973 | Neumann et al. | 214/16.1 A |

Primary Examiner—Robert J. Spar
Assistant Examiner—R. B. Johnson
Attorney, Agent, or Firm—Wegner, Stellman, McCord, Wiles & Wood

[57] ABSTRACT

An improved warehousing system whereby orders of material may be rapidly and efficiently filled and conveyed to a point of use or distribution. The system includes at least one elongated conveyor for moving material in a predetermined direction and an elongated walkway on at least one side of the conveyor in immediate adjacency thereto. A plurality of turntables, each having at least two angularly spaced material receiving stations are disposed immediately adjacent the walkway oppositely of the conveyor and are pivotally mounted so that a selected one of the material receiving stations may be disposed to face the walkway. A material loading area is located on a side of the turntables opposite from the walkway so that when the selected one of the material receiving stations is facing the walkway such that a person may retrieve material from the selected station and place the same on the conveyor, the other of the material receiving stations on the turntable is facing the loading area for replenishment if needed.

10 Claims, 4 Drawing Figures

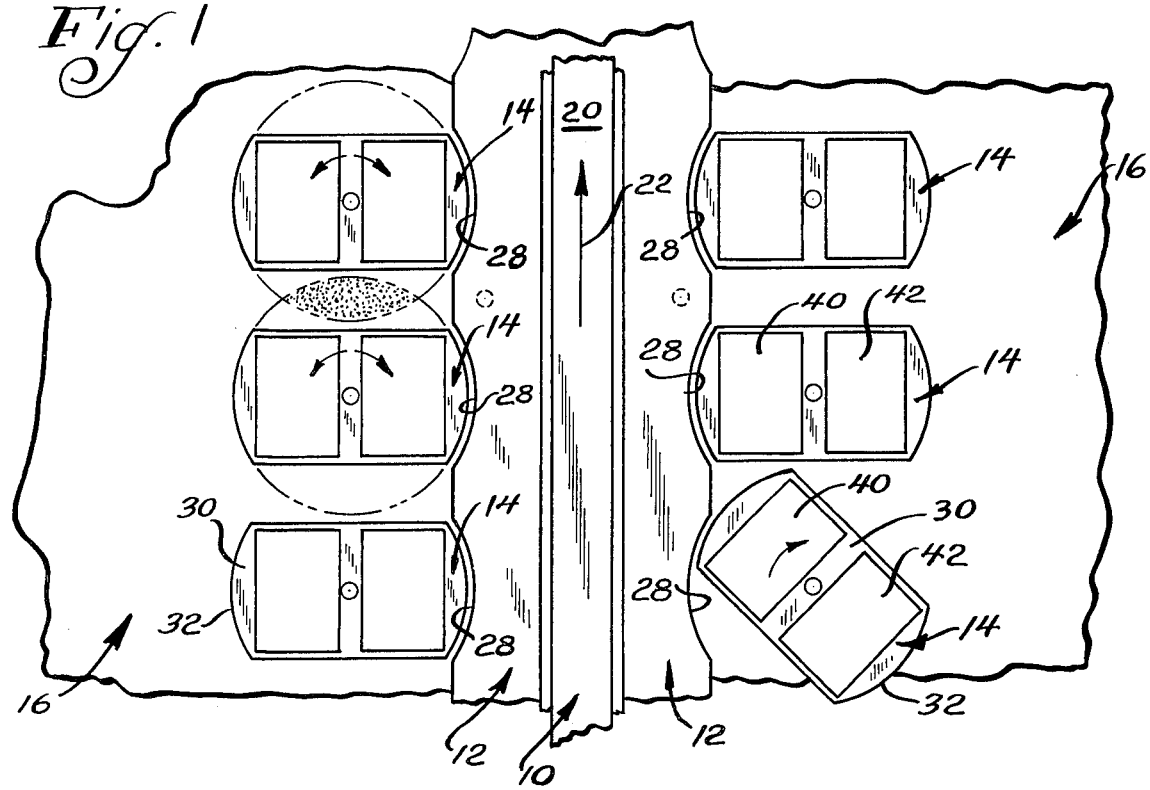
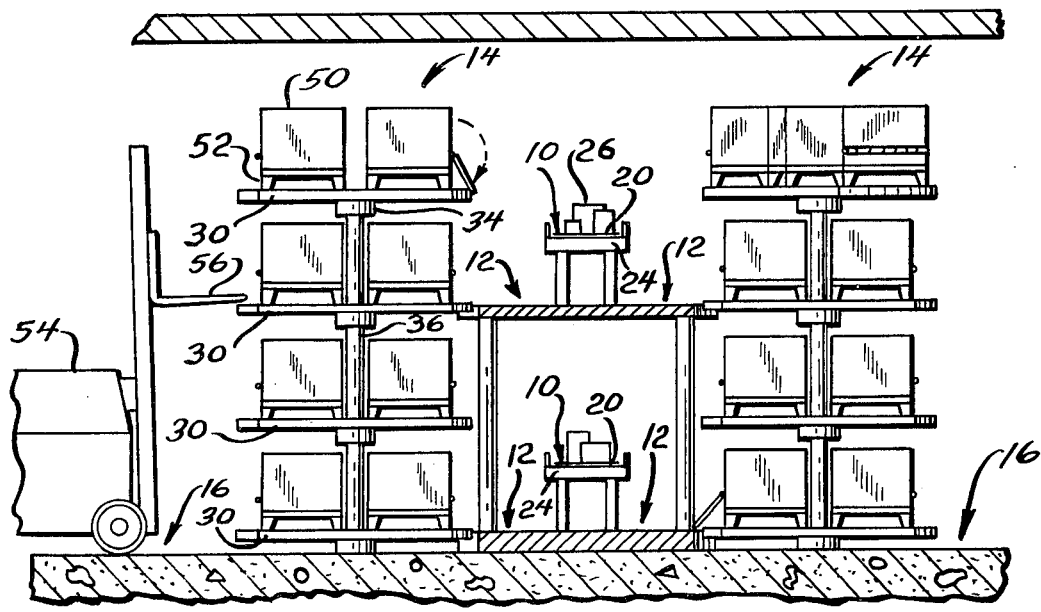

WAREHOUSING SYSTEM WITH TURNTABLE HAVING OPPOSED ARTICLE RECEIVING STATIONS THEREON

BACKGROUND OF THE INVENTION

This invention relates to warehousing systems, and, more specifically, to an improved warehousing system wherein orders are manually filled.

Prior art of possible relevance includes U.S. Pat. Nos. 3,554,391 to Goodell; 2,391,287 to Anchor; and 3,246,722 to Morrice.

Warehousing systems for maintaining inventories of a variety of materials which are manually retrieved when needed have long been known. However, many such systems are extremely inefficient. frequently, the person filling the order may be required to move to a storage area for a given material, retrieve the same, and return with it to a point of distribution. Since every such retrieval is in effect a "round trip" effort, considerable time is expended in moving to and from the distribution point. Even where the person filling the order retrieves more than one type of material during his trip to the storage area, the process is inefficient and is limited by the number of materials the person may adequately handle during a trip, whether or not a cart or the like is employed.

The inefficiency is further compounded in many systems when the supply of a given material has been exhausted. When such occurs, the storage area for that material will be replenished with the material, but in the meantime, orders for that material cannot be filled. Moreover, refilling of the supply of given materials that has been exhausted frequently results in the introduction of another person and/or apparatus into the warehousing area in such a way that free movement of the person filling the order is obstructed by such other person and/or apparatus. Consequently, time is frequently wasted by the person filling orders in waiting for the person replenishing the supply of an exhausted material to fulfill that duty before another order can be filled.

SUMMARY OF THE INVENTION

It is the principal object of the invention to provide a new and improved warehousing system. More specifically, it is an object of the invention to provide a new and improved warehousing system of the type wherein orders are manually filled and which eliminates inefficiency generated by round trips of the person retrieving materials; inefficiencies due to the exhaustion of particular materials; inefficiencies generated by obstruction of the person filling orders during replenishment of the supply of exhausted material; and otherwise maximizes the efficiency of use of warehousing space in a given structure.

An exemplary embodiment of the invention achieves the foregoing objects in a structure including one or more elongated conveyors on which filled orders of material may be placed and moved to a point of distribution. On at least one side of the conveyor there is an elongated walkway upon which a person filling orders may walk. On the side of the walkway opposite from the conveyor, there is located a plurality of turntables, each having two or more, angularly spaced, material receiving stations whereat the material employed in filling orders may be disposed. Each turntable is mounted for rotation such that a selected one of its material receiving stations may be brought into adjacency with the walkway so that the person filling an order need only move along the walkway to the desired turntable and its associated material receiving station for filling the order. The order may then be placed on the adjacent conveyor at that point and conveyed to the point of distribution, eliminating the need for a return to a point of distribution.

Identical materials may be disposed at each of the material receiving stations on a given turntable.

On the side of each turntable opposite from the walkway, there is provided a loading area. Identical materials are disposed in each of the material receiving stations of a given turntable. Consequently, when the supply of the material in one station is exhausted, the turntable may be pivoted to bring a new supply of that material into proximity of the walkway. Thereafter, the exhausted supply may be replenished by loading from the loading area. Consequently, a supply of a given material need never be exhausted and replenishment, when necessary, is performed at the loading area remote from the walkway and thereby does not interfere with the filling of orders during the replenishment operation.

In one embodiment of the invention, a storage area is provided adjacent the loading area on the side thereof opposite from the turntables. Consequently, the loading area may be employed to remove materials from the storage area prior to their delivery to a turntable. In such a case, the warehousing system is preferably disposed in a sheltering structure, such as a building, with the conveyor located along adjacent walls thereof in immediate proximity thereto with the storage area being located inwardly from the walls of the building where it is easily accessible.

In another embodiment of the invention, the foregoing arrangement of walkways, turntables and loading areas may be provided on both sides of the conveyor so that the conveyor may deliver orders to a point of use, which orders are filled from two separate sets of turntables.

According to either embodiment, the conveyors and walkways are superimposed one above the other, and each turntable is provided with several, vertically spaced, material receiving stations. Consequently, the inventory that may be maintained in a given floor space is maximized. Moreover, this construction maximizes the quantity of differing types of materials which are easily accessible to the person filling orders.

In a highly preferred embodiment of the invention, the turntables are defined by independently rotatable shelves mounted on a vertically extending post. Each shelf is defined by two symmetrical structures secured together in sandwiched relation about the post. Consequently, if one of the structures is damaged, it may be easily removed without disassembling the post or other shelf mounted thereon.

Other objects and advantages will become apparent from the following specification taken in connection with the accompanying drawings.

DESCRIPTION OF THE DRAWINGS

FIG. 1 is a fragmentary plan view of a warehousing system made according to the invention;

FIG. 2 is a fragmentary vertical section of the warehousing system of FIG. 1;

DESCRIPTION OF THE PREFERRED EMBODIMENTS

Figure 3:
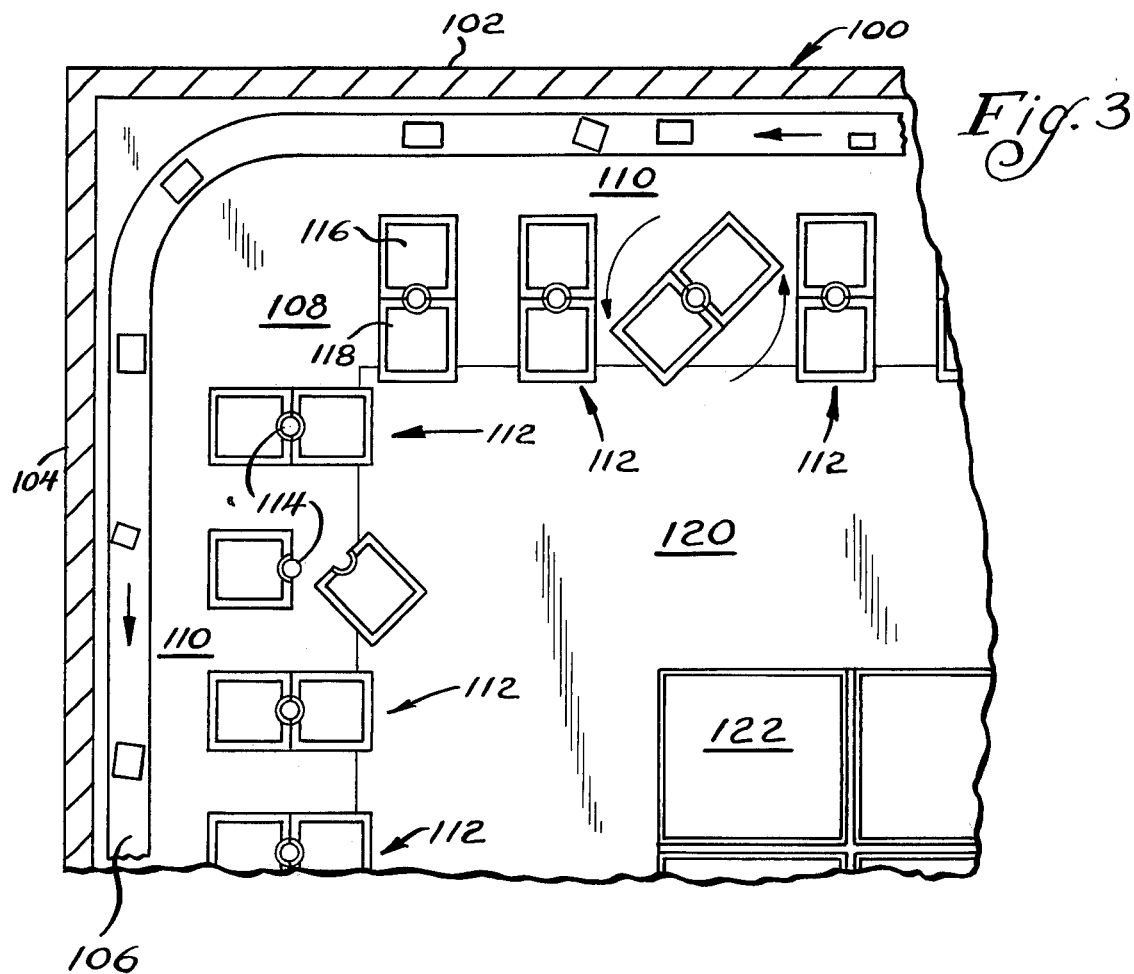
FIG. 3 is a fragmentary plan view of a modified embodiment of the warehousing system.

One exemplary embodiment of a warehousing system made according to the invention, in general terms, includes an elongated conveyor, generally designated 10, flanked by a pair of walkways, each generally designated 12. The conveyor 10 and walkways 12 are, in turn, flanked by rows of turntables, each generally designated 14, which, in turn, are flanked by loading areas, generally designated 16.

The conveyor 10 may be any type of suitable conveyor such as a belt conveyor 20 moved in the direction of an arrow 22 to convey materials placed thereon to a point of distribution. However, it is to be understood that the invention is not limited to the use of a belt such as the belt 20 and that the conveyor 10 could be, for example, an air conveyor.

The belt 20 is supported by suitable support structure 24 above the adjacent walkways 12 so that a person retrieving material from any one of the turntables 14 need not bend over to place packages 26, or the like, on the belt 20.

The walkways 12 may be formed of any suitable material such as concrete and are made sufficiently wide so that a person retrieving material from any of the turntables 14 can move freely. In addition, adjacent each of the turntables 14, each walkway 12 is provided with an arcuate, relieved portion 28 for purposes to be seen.

Each of the turntables 14 is defined by a plurality of vertically spaced shelves 30. As best seen in FIG. 1, each shelf 30 is elongated and the short ends thereof are arcuate as at 32 to define a convex end receivable in the associated concave relieved portion 28 and the adjacent walkway 12. Moreover, each shelf 30 is mounted by means of suitable bearings 34 on an upright 36 for rotation about a generally vertical axis. The arrangement is such that each of the shelves 30 is independently rotatable of the others in the corresponding turntable defined by a corresponding one of the uprights 36.

The vertical axis of rotation of each of the shelves 30, i.e., the elongated axis of the corresponding upright 36, divides each shelf 30 into opposed material receiving areas 40 and 42. As can be seen in FIG. 1, when one of the material receiving areas, such as the area 40, is facing the corresponding walkway 12, the opposite material receiving area 42 will be facing the loading area 16. Consequently, once material receiving area 40 has been depleted by a person retrieving orders, it is only necessary to rotate the corresponding shelf 30 through 180° to dispos the material receiving area 42 adjacent the walkway 12. Assuming that the material receiving area 42 contains a fresh supply of material, there need be no interruption in the filling of orders by reason of exhaustion of a particular material. At the same time, working from the loading area 16, the now exhausted supply in the material receiving area 40 associated with that particular shelf can be replenished.

To this end, it is preferable that each material receiving area 40 or 42 be such as to receive a removable bin 50 or the like which has depending legs 52 or a common pallet (not shown). Thus, a forklift truck 54 operating in each of the loading areas 16 may be employed to remove the bins 50 when the supply of material therein has been exhausted by means of a conventional forklift structure 56 which may be inserted between the bin 50 and the underlying shelf 30. Once the empty bin 50 has been removed, a filled bin 50 may be substituted by reversing the procedure.

It is also to be observed that the vertical axis of rotation of each of the shelves 30 defined by the upright 36 is spaced from the vertical axis of the next adjacent turntable by a distance less than the elongated dimension of each of the shelves 30. This permits provision of a maximum number of the turntables 14 for a given floor area. It is only necessary that the axes of adjacent turntables be spaced slightly greater than one half of the sum of the length and the width of a shelf 30 may be rotated through 180° when adjacent shelves are in the position shown in the left-hand side of FIG. 1 without contact therewith.

Of course, if desired, suitable detents or locks may be provided to maintain the shelves in their proper orientation until the operator perceives a need to rotate the same.

Another feature of the invention which maximizes stock selection capability with respect to a given floor area is illustrated particularly in FIG. 2. In this case, there are plural ones of the walkways and plural ones of the conveyors and the same are arranged in superimposed relation. At the same time, each of the turntables is made up of a plurality of the shelves 30 at each level, each level being defined by the existence of a walkway 12. As a consequence, the use of floor space is maximized.

A modified and highly preferred embodiment of the invention is illustrated in FIG. 3 in a building or structure, generally designated 100, have intersecting walls 102 and 104. A conveyor 106 of conventional construction is located immediately adjacent the walls 102 and 104 for conveying articles to a point of distribution (not shown).

An elevated platform 108, generally akin to the platform defining the uppermost walkway 12 in the embodiment illustrated in FIG. 2 defines a walkway area 110 adjacent to the conveyor 106. On the side of the walkway 110, opposite from the conveyor 106, there is located a plurality of turntables, each generally designated 112, which may be journalled for rotation about a vertical axis on posts 114 and which may be superimposed, as previously described in connection with the embodiment illustrated in FIGS. 1 and 2.

Moreover, like the turntables described in connection with the embodiment of FIGS. 1 and 2, the turntables 112 have two, angularly spaced, material receiving shelves 116 and 118. On the side of the turntable 112, opposite from the walkway 110, the building 100 is provided with a loading area 120 from which the turntables 112 may be serviced in the same manner as the turntables may be serviced from the loading area 16 as mentioned previously in connection with the description of FIGS. 1 and 2.

Moreover, on the side of the loading area 120, opposite from the turntable, there may be provided a storage area 122 whereat inventory employed for replenishing the supplies on the various turntables 112 may be stored. Consequently, a forklift truck or the like may operate in the loading area 120 to remove depleted bins or pallets from the turntable 112 as required and to thereafter move to the storage area 122 to retrieve a new bin or pallet for replacement on the given one of the turntables 112.

The embodiment illustrated in FIG. 3 is preferred to that illustrated in FIGS. 1 and 2 to the extent that overall inventory may be centrally located in the storage area 122, which storage area may then be accessible from a single loading area to service all turntables 112 in the system. Of course, the invention contemplates combinations of the arrangements of the two embodiments, if desired.

Figure 4:
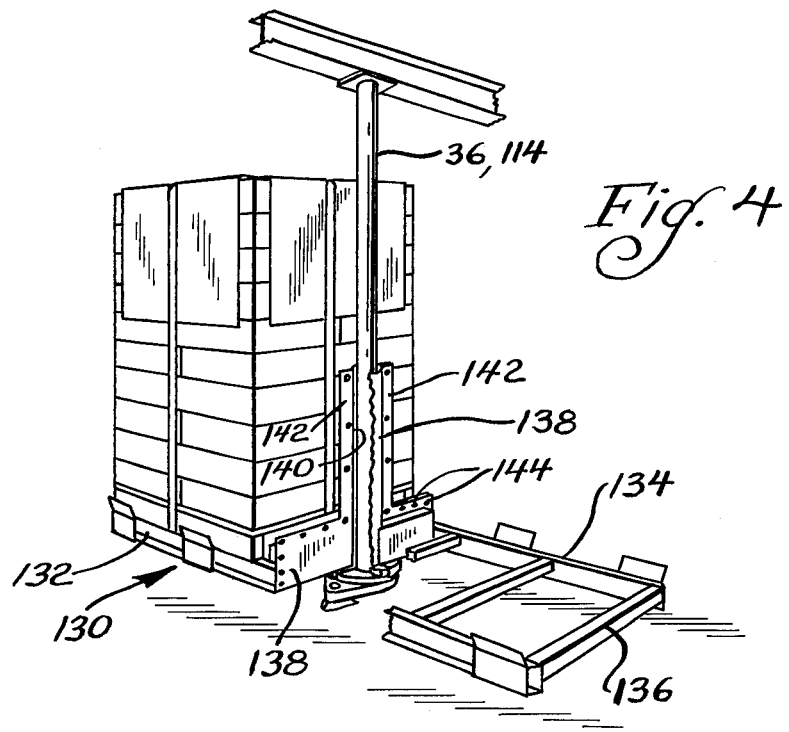
FIG. 4 is a perspective view of a turntable structure employed in the invention with parts broken away for clarity.

FIG. 4 illustrates a preferred form of shelf for use in either embodiment. In FIG. 4, the post for journalling the superimposed turntable shelves is designated 36, 114 and is shown in connection with a single shelf designated 130. The shelf 130 has one material receiving station 134. Each material receiving station 132 and 134 includes a generally horizontally extending frame 136 for receipt of a pallet or a bin and which may be formed in any conventional fashion. At one end of each frame 136, there is provided an inverted, T-shaped plate 138 having an elongated, vertically extending, semi-cylindrical recess 140 facing the post 36, 114. To the sides of each recess 140 are flanges 142. The arrangement is such that each material receiving station 132 and 134 is symmetrical to the other so that the same may be sandwiched about the post 36, 114 and secured together as by bolts 144.

As a consequence of this construction, it will be appreciated that when damage to one or the other of the material receiving stations 132 and 134 defining a shelf 130 occurs, as for example, due to carelessness on the part of a forklift truck driver or the like, the same may be easily removed from the post 36, 114 for replacement without removal of the post. This is of particular advantage where the shelves are superimposed, as illustrated in FIG. 2, since only one turntable shelf in a stack need be down at any given time for servicing allowing the remaining turntables in that stack to remain in use.

From the foregoing, it will be appreciated that a warehousing system made according to the invention eliminates the need for inefficient "round trips" by a person filling orders from inventory. It is only necessary that such a person move along the walkways to the desired turntable, retrieve the material ordered, and place the same on the conveyor. Thus, the trip from the point of storage to the distribution point is eliminated.

It will also be appreciated that through proper use of the system wherein both material receiving areas on a given shelf are provided with a supply of the same material, delays due to exhaustion of supply can be totally eliminated. When material in one area is depleted, it is only necessary to rotate the corresponding shelf to have access to a fresh supply of the same material. At this time, the exhausted area may then be replenished by any suitable means operating in the loading area.

Finally, it will be appreciated that replenishing operations taking place in the loading area in no way interfere with the filling of orders which takes place on the walkways.

I claim:

1. A warehousing system comprising: an elongated conveyor for moving material in a predetermined direction; means defining an elongated walkway on at least one side of said conveyor; means defining a material loading area extending in parallel spaced relationship to said walkway; a plurality of turntables, at least one of said turntables having independently rotatable shelves thereon, each shelf having opposite material receiving stations, said turntables being disposed between said walkway and said material loading area in a series extending parallel to said walkway, said turntables being mounted for rotation about parallel vertical axes so that either of said material receiving stations may be selectively disposed to face and being accessible from the walkway with the other of said material receiving stations facing and being accessible to said loading area to be reloadable therefrom as desired; and means for placing on a receiving station facing the loading area concurrently a plurality of warehoused articles to be removed manually piecemeal therefrom and placed on said conveyor when the so placed articles are brought adjacent to the walkway by subsequent rotation of the turntable.

2. The warehousing system of claim 1 wherein there are plural ones of said conveyors and said walkway in superimposed relation, and each said turntable comprises plural, independently rotatable shelves in superimposed relation.

3. The warehousing system of claim 2 wherein said shelves are rotatable about a vertical axis.

4. The warehousing system of claim 3 wherein said shelves are elongated and the axes of rotation of shelves of adjacent turntables are spaced a distance less than the maximum dimension of the shelves.

5. The warehousing system of claim 1 wherein each turntable includes independently rotatable shelves, each shelf having at least said two opposed material receiving stations.

6. The warehousing system of claim 1 wherein said conveyor is elevated above said walkways.

7. The warehousing system of claim 1 wherein each said said material receiving station is defined by a removable material support structure.

8. The warehousing system of claim 1 further including an enclosing structure housing said system and having at least two joining exterior walls, said conveyor being immediately adjacent to said walls, and means within said enclosing structure adjacent said loading area oppositely from said turntables defining a storage area accessible from said loading area, whereby material in said storage area may be easily moved therefrom to said turntables.

9. The warehousing system of claim 1 wherein each said turntable is defined by parallel, independently rotatable shelves in superimposed relation, a generally vertically extending post, means journalling said shelves on said post for rotation about a generally vertical axis; each said shelf being defined by at least two, generally symmetrical material support structures sandwiching the corresponding post; and releasable means securing said material support structures to each other in sandwiched relation about the associated post, whereby when one of said material support structures is damaged, it may be readily removed from the associated post without removing the post and/or other shelves journalled on the post.

10. A warehousing system comprising: an elongated conveyor for moving material in a predetermined direction; means defining a pair of elongated walkways one each along opposite sides of said conveyor; means defining a material loading area extending in parallel spaced relationship outwardly of each of said walkways; a plurality of turntables, at least one of said turntables having independently rotatable shelves thereon, each shelf having opposite material receiving stations, said turntables being disposed between said walkways and said material loading area in a pair of series extending extending parallel to said walkways, said turntables being mounted for rotation about parallel vertical axes so that either of said material receiving stations may be selectively disposed to face and being accessible from a walkway with the other of said material receiving stations facing and being accessible to a loading area to be reloadable therefrom as desired; and means for placing on a receiving station facing a loading area concurrently a plurality of warehouse articles to be removed manually piecemeal therefrom and placed on said conveyor when the so placed articles are brought adjacent to a walkway by subsequent rotation of the turntable.

* * * * *